US010503909B2

United States Patent
Schmidt et al.

(10) Patent No.: US 10,503,909 B2
(45) Date of Patent: Dec. 10, 2019

(54) SYSTEM AND METHOD FOR VULNERABILITY REMEDIATION VERIFICATION

(71) Applicant: HEWLETT PACKARD ENTERPRISE DEVELOPMENT LP, Houston, TX (US)

(72) Inventors: Peter Schmidt, Saginaw, MI (US); Jeff Kalibjian, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 272 days.

(21) Appl. No.: 15/500,898

(22) PCT Filed: Oct. 31, 2014

(86) PCT No.: PCT/US2014/063314
§ 371 (c)(1),
(2) Date: Jan. 31, 2017

(87) PCT Pub. No.: WO2016/068974
PCT Pub. Date: May 6, 2016

(65) Prior Publication Data
US 2017/0220808 A1 Aug. 3, 2017

(51) Int. Cl.
G06F 21/00 (2013.01)
G06F 21/57 (2013.01)
(Continued)

(52) U.S. Cl.
CPC ............ G06F 21/577 (2013.01); G06F 11/00 (2013.01); G06F 21/00 (2013.01); G06F 21/568 (2013.01);
(Continued)

(58) Field of Classification Search
CPC ...... G06F 21/577; G06F 21/00; G06F 21/568; G06F 11/00; G06F 11/004; G06F 2221/034
See application file for complete search history.

(56) References Cited

U.S. PATENT DOCUMENTS 7,660,419 B1  2/2010  Ho
8,046,195 B2  10/2011 Vecera et al.
(Continued)

FOREIGN PATENT DOCUMENTS

WO      2008/121744 A2    10/2008

OTHER PUBLICATIONS

The Open Group, "SOA Reference Architecture Technical Standard: Integration Layer," 8 p, Sep. 22, 2014.
(Continued)

Primary Examiner — Sarah Su
(74) Attorney, Agent, or Firm — Hewlett Packard Enterprise Patent Department

(57) ABSTRACT

In remediating a computer vulnerability, operations to be performed to correct the vulnerability are identified. Remediation processors are scheduled to perform the operations. Whether the vulnerability has been corrected is determined by: determining whether the operations have been performed successfully; and determining whether the operations have been performed by authorized remediation processors.

16 Claims, 6 Drawing Sheets

(51) Int. Cl.
*G06F 11/00* (2006.01)
*G06F 21/56* (2013.01)
(52) U.S. Cl.
CPC ...... *G06F 11/004* (2013.01); *G06F 2221/034* (2013.01)

(56) References Cited

U.S. PATENT DOCUMENTS

| | | | |
|---|---|---|---|
| 8,090,660 B2 | 1/2012 | Solomon et al. | |
| 8,112,434 B2 | 2/2012 | Patten et al. | |
| 8,156,140 B2 | 4/2012 | Roshen et al. | |
| 8,185,916 B2 | 5/2012 | Toussaint et al. | |
| 8,200,278 B2 | 6/2012 | Little | |
| 8,250,654 B1* | 8/2012 | Kennedy | H04L 41/22 713/187 |
| 8,265,275 B2 | 9/2012 | Lotspiech | |
| 8,321,909 B2 | 11/2012 | Fot et al. | |
| 8,364,745 B2 | 1/2013 | Roshen | |
| 8,379,847 B2 | 2/2013 | Bell et al. | |
| 8,433,746 B2 | 4/2013 | Vecera et al. | |
| 8,458,793 B2 | 6/2013 | McKenna | |
| 8,489,733 B2 | 7/2013 | Vecera et al. | |
| 8,561,175 B2 | 10/2013 | Williams et al. | |
| 8,570,905 B2 | 10/2013 | Hulse et al. | |
| 8,613,043 B2 | 12/2013 | Fot et al. | |
| 8,655,941 B2 | 2/2014 | Roshen | |
| 8,707,427 B2 | 4/2014 | Hooks et al. | |
| 8,775,651 B2 | 7/2014 | Brown et al. | |
| 9,239,841 B2 | 1/2016 | Arnaudov et al. | |
| 9,697,061 B1 | 7/2017 | Lazier | |
| 2002/0112156 A1* | 8/2002 | Gien | G06F 21/645 713/156 |
| 2006/0005010 A1 | 1/2006 | Olsen et al. | |
| 2006/0031938 A1 | 2/2006 | Choi | |
| 2006/0101517 A1* | 5/2006 | Banzhof | G06F 21/577 726/25 |
| 2006/0101519 A1* | 5/2006 | Lasswell | G06F 21/577 726/25 |
| 2006/0168653 A1* | 7/2006 | Contrera | G06F 21/34 726/9 |
| 2006/0218635 A1* | 9/2006 | Kramer | G06F 21/56 726/22 |
| 2006/0282897 A1* | 12/2006 | Sima | G06F 11/3664 726/25 |
| 2007/0100913 A1 | 5/2007 | Sumner et al. | |
| 2007/0294376 A1* | 12/2007 | Ayachitula | G06F 8/61 709/220 |
| 2008/0092237 A1 | 4/2008 | Yoon et al. | |
| 2008/0140759 A1 | 6/2008 | Conner et al. | |
| 2009/0006167 A1 | 1/2009 | Toussaint et al. | |
| 2009/0064271 A1 | 3/2009 | Ng et al. | |
| 2009/0086965 A1 | 4/2009 | Glendinning | |
| 2009/0271863 A1* | 10/2009 | Govindavajhala | G06F 21/577 726/23 |
| 2010/0100965 A1 | 4/2010 | O'Brien et al. | |
| 2010/0174684 A1 | 7/2010 | Schwaab et al. | |
| 2011/0078798 A1* | 3/2011 | Chen | G06F 21/577 726/25 |
| 2011/0125527 A1 | 5/2011 | Nair | |
| 2011/0153712 A1 | 6/2011 | Whetsel | |
| 2011/0302412 A1 | 12/2011 | Deng et al. | |
| 2012/0166799 A1 | 6/2012 | Shamsaasef et al. | |
| 2012/0174185 A1 | 7/2012 | Milman et al. | |
| 2012/0185725 A1 | 7/2012 | Peters et al. | |
| 2013/0086689 A1 | 4/2013 | Laverdiere-Papineau | |
| 2013/0104236 A1 | 4/2013 | Ray et al. | |
| 2013/0318536 A1* | 11/2013 | Fletcher | G06F 9/5011 718/104 |
| 2013/0332660 A1 | 12/2013 | Talagala et al. | |
| 2014/0068630 A1 | 3/2014 | Fildebrandt | |
| 2014/0082736 A1 | 3/2014 | Guarnieri et al. | |
| 2014/0089264 A1 | 3/2014 | Talagala et al. | |
| 2014/0164776 A1 | 6/2014 | Hook et al. | |
| 2014/0177839 A1 | 6/2014 | Wagner et al. | |
| 2014/0189340 A1 | 7/2014 | Hadley | |
| 2014/0344569 A1 | 11/2014 | Li | |
| 2015/0172308 A1* | 6/2015 | Borohovski | H04L 63/1433 726/25 |
| 2015/0326547 A1 | 11/2015 | Carlson | |
| 2015/0381578 A1 | 12/2015 | Thota et al. | |
| 2016/0072886 A1 | 3/2016 | Lin et al. | |

OTHER PUBLICATIONS

Reserve Bank of India, "Working Group Report on Cloud Computing Option for Urban Cooperative Banks," Oct. 5, 2012, pp. 1-18, Available at: <rbi.org.in/scripts/PublicationReportDetails.aspx?ID=679>.

Lisa Phifer, "Managing WLAN Risks with Vulnerability Assessment," Technology Whitepaper, 2011, pp. 1-23, AirMagnet, Inc.

International Search Report and Written Opinion received for PCT Patent Application No. PCT/US2014/073036, dated Jul. 7, 2015, 7 pages.

International Search Report and Written Opinion received for PCT Patent Application No. PCT/US2014/063435, dated Jun. 29, 2015, 9 pages.

International Search Report and Written Opinion received for PCT Patent Application No. PCT/US2014/063314, dated Jul. 31, 2015, 12 pages.

International Preliminary Report on Patentability received for PCT Patent Application No. PCT/US2014/073036, dated Jul. 13, 2017, 6 pages.

International Preliminary Report on Patentability received for PCT Patent Application No. PCT/US2014/063435, dated May 11, 2017, 8 pages.

International Preliminary Report on Patentability received for PCT Patent Application No. PCT/US2014/063314, dated May 11, 2017, 11 pages.

Eldos Corporation, "Securing Your Client-server or Multi-tier Application," 2014, pp. 1-16 [online], Retrieved from the Internet on Sep. 23, 2014 at URL: <eldos.com/security/articles/1942.php?page=all>.

Dan Schutzer et al., "Big Data and Security," The Innovator, Jan. 2013, pp. 1-23, vol. 54, Issue 1, BITS Financial Services Roundtable.

* cited by examiner

SYSTEM AND METHOD FOR VULNERABILITY REMEDIATION VERIFICATION

BACKGROUND

A vulnerability is a security defect in a computer system or associated software that allows an attacker to potentially violate the confidentiality, integrity, operations, availability, access control, and/or data of the system or software. Vulnerabilities may result from bugs, design flaws, configuration errors, etc. in the system or software. Various tools have been developed to aid in management of computer system vulnerabilities.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Computer vulnerabilities include flaws in software executed by a computer system. Input value validation errors and buffer overflow errors are examples of software flaws that can be exploited by an attacker to misuse a computer system. Vulnerability scanning tools examine computer systems and software applications to identify vulnerabilities. Identified vulnerabilities may be automatically or manually corrected. Conventional vulnerability monitoring systems provide very weak confirmation that a vulnerability has been corrected. For example, conventional vulnerability monitoring systems generally attempt to confirm vulnerability correction via passive rescan of the computer system. That is, if a previously detected vulnerability is not detected by a re-scan, then the vulnerability is deemed to have been corrected.

The remediation system disclosed herein provides positive verification of vulnerability remediation by confirming that operations specified to correct an identified vulnerability have been performed by entities authorized to perform the remediation operations. The remediation system disclosed herein is applicable, for example, to computer systems and networks that are continuously monitored for vulnerabilities, and can provide positive, deterministic confirmation of vulnerability correction in such systems.

Figure 1:
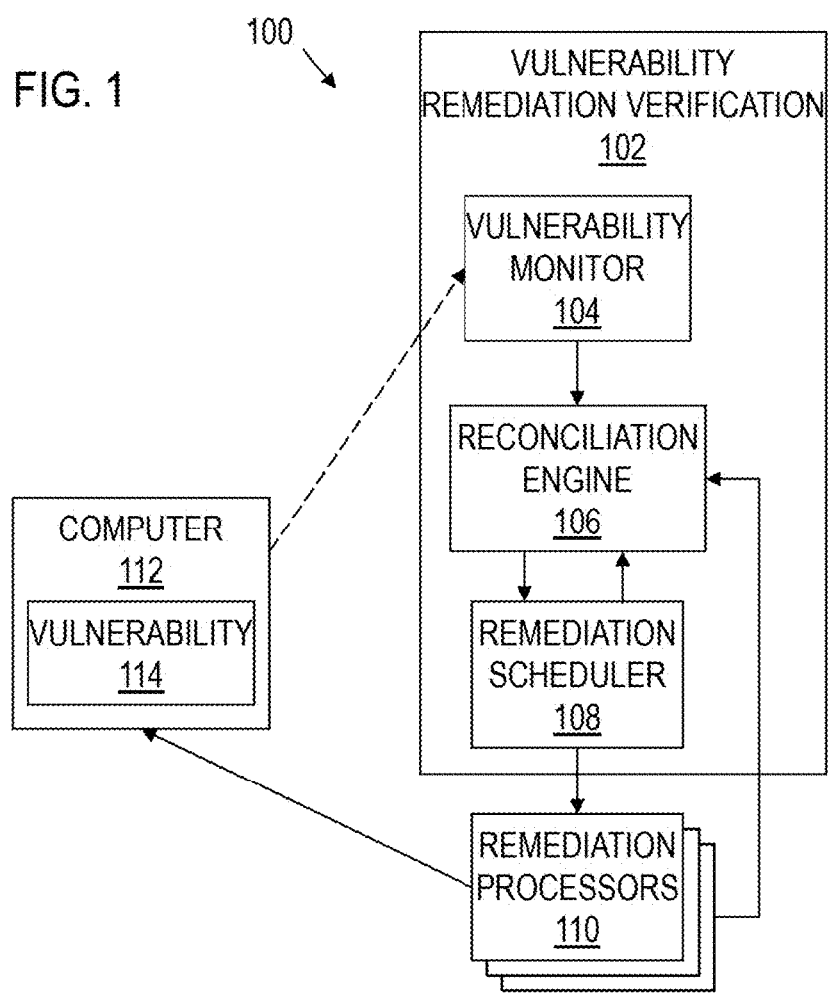
FIGS. 1 and 2 show block diagrams of a system for verifying vulnerability remediation in accordance with various examples.
Figure 2:
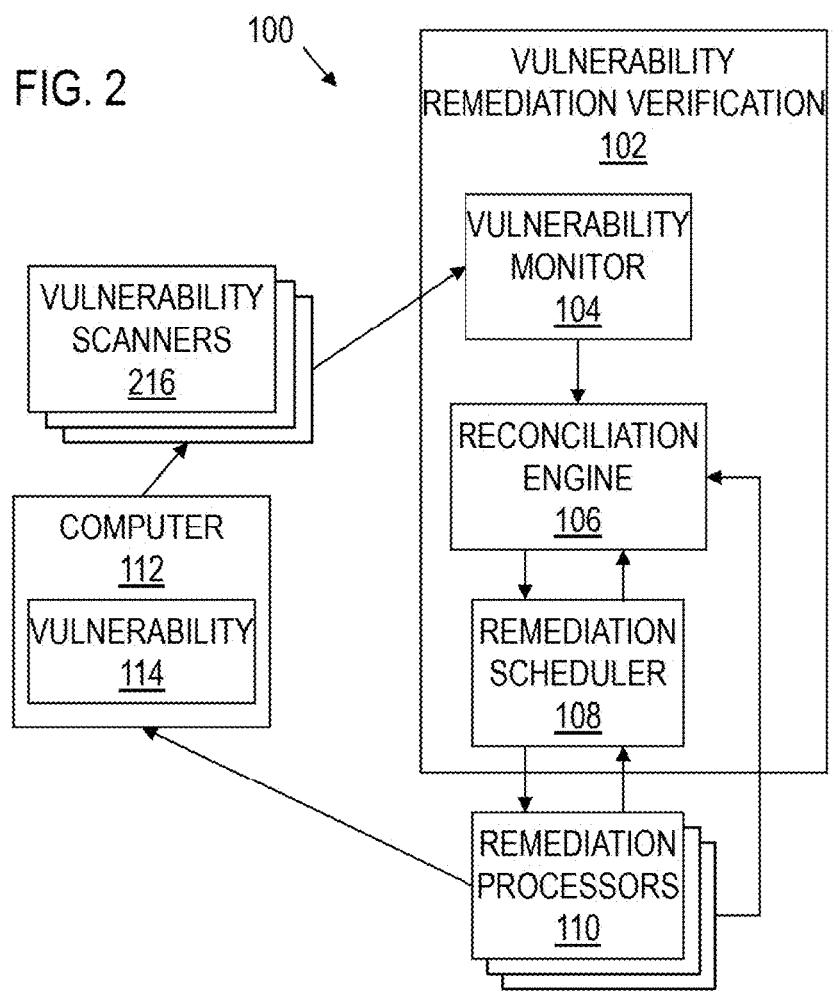

FIGS. 1 and 2 show block diagrams of a system 100 for verifying vulnerability remediation in accordance with various examples. The system 100 includes a vulnerability remediation verification sub-system 102, remediation processors 110, vulnerability scanners 216, and a computer 112. In practice, the system 100 may include a plurality of computers 112 coupled to the vulnerability remediation verification sub-system 102, remediation processors 110, and vulnerability scanners 216 via a wired and/or wireless networking technology. For example, the computer(s) 112 may be interconnected and coupled to the vulnerability remediation verification sub-system 102, remediation processors 110, and vulnerability scanners 216 via a network in accordance with an IEEE 802.11, standard, an IEEE 802.3 standard, a wide-area network, the Internet, etc.

The vulnerability scanners 216 are systems that examine the computer(s) 112 to determine whether the computer(s) 112 are susceptible to attack and misuse by unauthorized entities. The vulnerability scanners 216 may examine the software, memory contents, operational settings, and/or other features of the computer(s) 112 to identify vulnerabilities. Some vulnerability scanners 216 may compare known vulnerability data patterns to the software, memory contents, etc. of the computer(s) 216, evaluate computer operational settings, etc., in order to identify vulnerabilities.

The remediation processors 110 implement remediation processes that access the computer(s) 112 to correct vulnerabilities identified by the vulnerability scanners 216. For example, when a program that contains a security flaw is identified in the computer(s) 112 by the vulnerability scanners 216, the remediation processors 110 may be applied to uninstall the identified program and install an updated version of the program in which the security flaw is corrected. Similarly, if the vulnerability scanners 216 identify malicious software on the computer(s) 112, the remediation processors 110 may be activated to remove or quarantine the malicious software. If security or other operational settings of a computer 112 are found to be non-compliant with predetermined settings values, then the remediation processors 110 may change the settings values to comply with the predetermined settings values.

In some implementations of the system 100, at least some of the vulnerability scanners 216 and the remediation processors 110 may be integrated into a single sub-system (e.g., a combined scanner/processor).

The vulnerability remediation verification sub-system 102 provides positive verification of correction of an identified vulnerability, positive verification that each operation needed to correct an identified vulnerability has been performed, and positive verification that each operation is performed by a remediation processor 110 authorized to perform the operation. The vulnerability remediation verification sub-system 102 includes vulnerability monitor 104, reconciliation engine 106, and remediation scheduler 108.

The vulnerability monitor 104 is communicatively coupled to the vulnerability scanners 216. The vulnerability monitor 104 is notified by the vulnerability scanners 216 of each vulnerability (e.g., the vulnerability 114) identified in the computer(s) 112. On notification of the vulnerability 114, the vulnerability monitor 104, stores that information in a database, sets a deadline for completion of remediation, and generates a vulnerability identification structure (i.e., an identified vulnerability token, IVT) that contains information regarding the vulnerability. Some implementations of the vulnerability monitor 104 may generate an IVT including the following fields and information.

| | |
|---|---|
| Token_Id [ IVT ] | Indicates token type |
| Unique IVT Serial Number [USN] | Unique generated serial number |
| Time: [<24H:MM:SS>] | Time of token creation |
| Date:[<MM/DD/YYYY>] | Date of token creation |
| Remediation Completion By Date: [<MM/DD/YYYY>] | Date remediation must be complete |
| System ID [<IP Address of client or server>] | IF address of where vulnerability found |
| | MAC of device where vulnerability found |
| | Hostname of where vulnerability found |
| Vulnerability Summary [nationally recognized ID (e.g., CVE) or other description] | ID/text defining vulnerability or threat |
| Other Vulnerability Details [OS ID or SOFTWARE ID or HARDWARE ID or OTHER_TEXT] | Any other details associated with the vulnerability or threat |
| Digital signature [D_DIG_SIG] | Digital signature taken over entire IVT token. Signed using digital identity of vulnerability monitor |

The vulnerability monitor 104 signs the vulnerability token with the identity of the vulnerability monitor 104. The vulnerability monitor 104 passes the completed and signed vulnerability token to the reconciliation engine 106.

The reconciliation engine 106 implements a reconciliation process that receives the vulnerability token generated by the vulnerability monitor 102, and extracts the information identifying the vulnerability, the computer 112 where the vulnerability is located, and other information from the token. The reconciliation engine 106 examines the signature contained in the token to verify that the vulnerability token is valid.

If the token's digital signature indicates that the token is valid, the reconciliation engine 106 provides the vulnerability information extracted from the token to the remediation scheduler 108. As described below, the reconciliation engine 106 tracks and verifies the remediation process.

The remediation scheduler 108 implements an automated remediation scheduling process that first defines the operations to be performed to correct the vulnerability 114, and then selects one or more suitable remediation processors 110 to perform the operations. The remediation scheduler 108 schedules the selected remediation processors 110 to perform the remediation operations prior to the deadline set in the vulnerability token.

To provide tracking of the remediation process, the remediation scheduler 108 creates a remediation token (RT) that specifies the operations to be performed and the remediation processor 110 selected to perform each operation, and includes fields in which each selected remediation processor 110 stores identification, remediation actions performed, results of testing the remediation actions, and a verifying digital signature of the remediation processor 110. Each remediation operation and associated information is organized in the remediation token as a remediation frame. Some implementations of the remediation scheduler 108 may generate a RT including the following fields and information.

| | |
|---|---|
| Token_Id [ RT ] | Indicates token type |
| Reference Unique IVT Serial Number [RUSN] | Referenced unique generated serial number from the IVT |
| Time: [<24H:MM:SS>] | Time of token creation |
| Date:[<MM/DD/YYYY>] | Date of token creation |
| Remediation Completion By Date: [<MM/DD/YYYY>] | Date remediation must be complete |
| System ID [<IP Address of client or server>] | IP address of where vulnerability found |
| | MAC of device where vulnerability found |
| | Hostname of where vulnerability found |
| Vulnerability Summary [nationally recognized ID (e.g., CVE) or other description] | ID/text defining vulnerability or threat |
| Other Vulnerability Details [OS ID \|\| SOFTWARE ID \|\| HARDWARE ID \|\| OTHER_TEXT] | Other details associated with the vulnerability or threat |
| Required Remediation Actions [N] | Number of operations to fully remediate |
| Remediation Frame 1 | Details of first remediation operation to correct vulnerability |
| Remediation Entity [TICKET_SYSTEM \|\| PATCH_SYSTEM \|\| MANUAL \|\| OTHER} | Remediation processor that performed the remediation operation |
| Remediation Action [PATCH \| \| AUTOCONFIGURE \| MANUALCONFIGURE \| OTHER] | How was the remediation accomplished? |
| Remediation Testing Results [PASS \| FAIL \| ERROR \| UNKNOWN \| NOTAPPLICABLE \| NOTCHECKED] also... NOT SELECTED \| FIXED | After the operation, did a test show positive evidence that the fix was in place and the vulnerability eliminated. |
| Digital signature [RF_DIG_SIG] | Digital signature over remediation frame 1 using digital signature of the remediation processor |
| Remediation Frame N | Details of the last remediation action to correct the vulnerability (there will be 1 or more per vulnerability) |
| Remediation Entity [TICKET_SYSTEM \|\| PATCH_SYSTEM \|\| MANUAL \|\| OTHER} | Remediation processor that performed the remediation operation |
| Remediation Action [PATCH \| OTHER] | How was the remediation accomplished? |
| Remediation Testing Results [PASS \| FAIL \| ERROR \| UNKNOWN \| NOTAPPLICABLE \| NOTCHECKED] also.. NOT SELECTED \| FIXED | After the patch or other actions, did a test show positive evidence that the fix was in place and the vulnerability eliminated. |
| Digital signature [RF_DIG_SIG] | Digital signature over remediation frame N, using digital identity of the remediation processor |
| Digital signature [D_DIG_SIG] | Digital signature taken over entire RT token and signed using digital identity of the remediation scheduler |

The remediation scheduler 108 passes the remediation token to the remediation processors 110, and the remediation processors 110 perform the operations specified in the remediation token to correct the vulnerability 114. In some implementations, the remediation scheduler 114 may sequentially pass the remediation token to different selected remediation processors 110 as needed to perform the remediation operations specified in the remediation token. In some implementations a remediation processor 110 may pass the remediation token to a different remediation processor 110 in accordance with the specified remediation operations.

Each remediation processor 110 that receives the remediation token performs the operation(s) specified for the remediation processor 110, tests results of the operation, records the results of the test in the remediation token, and inserts the signature of the remediation processor 110 into the remediation frame specifying the operation performed. As each remediation operation is completed, the remediation processor 110 that performed the operation may pass the remediation token back to the remediation scheduler or to a different remediation processor 110. In some implementations, the remediation processors 110 may also notify the reconciliation engine 106 of completion of a remediation operation to allow the reconciliation engine 106 to track the progress of the remediation process. The remediation processors 110 may provide notification to the reconciliation engine 106 of each operation being completed by passing a copy of the remediation token to the reconciliation engine 106.

On completion of the last operation specified in the remediation token, the remediation processor 110 that performed the operation returns the remediation token to the remediation scheduler 108. The remediation scheduler 108 signs the entire remediation token, indicating that all remediation operations have been performed, and passes the remediation token to the reconciliation engine 106.

The reconciliation engine 106 receives the remediation token from the remediation scheduler 108, and analyzes the remediation token to determine whether the vulnerability 114 has been corrected. In determining whether the vulnerability 114 has been corrected, the reconciliation engine 106:

Verifies that all of the specified remediation operations were performed prior to the remediation completion deadline specified in the vulnerability token.

Verifies that the remediation scheduler 108 has signed the remediation token.

Verifies that each remediation frame of the remediation token includes test result status that indicates a "PASS" condition. All other test result statuses may result in a vulnerability correction failure conclusion by the reconciliation engine 106.

Verifies that each remediation frame of the remediation token includes the signature of the authorized remediation processor 110 that performed the operation.

If each of these verifications is successful, then the reconciliation engine 106 deems the vulnerability 114 to be corrected. If any of the verifications is unsuccessful, then the reconciliation engine 106 may deem the remediation unsuccessful.

The reconciliation engine 106 may provide final results of the remediation to other systems, to the vulnerability monitor 104, to a dashboard for display, to a vulnerability remediation database for storage, etc.

Figure 3:
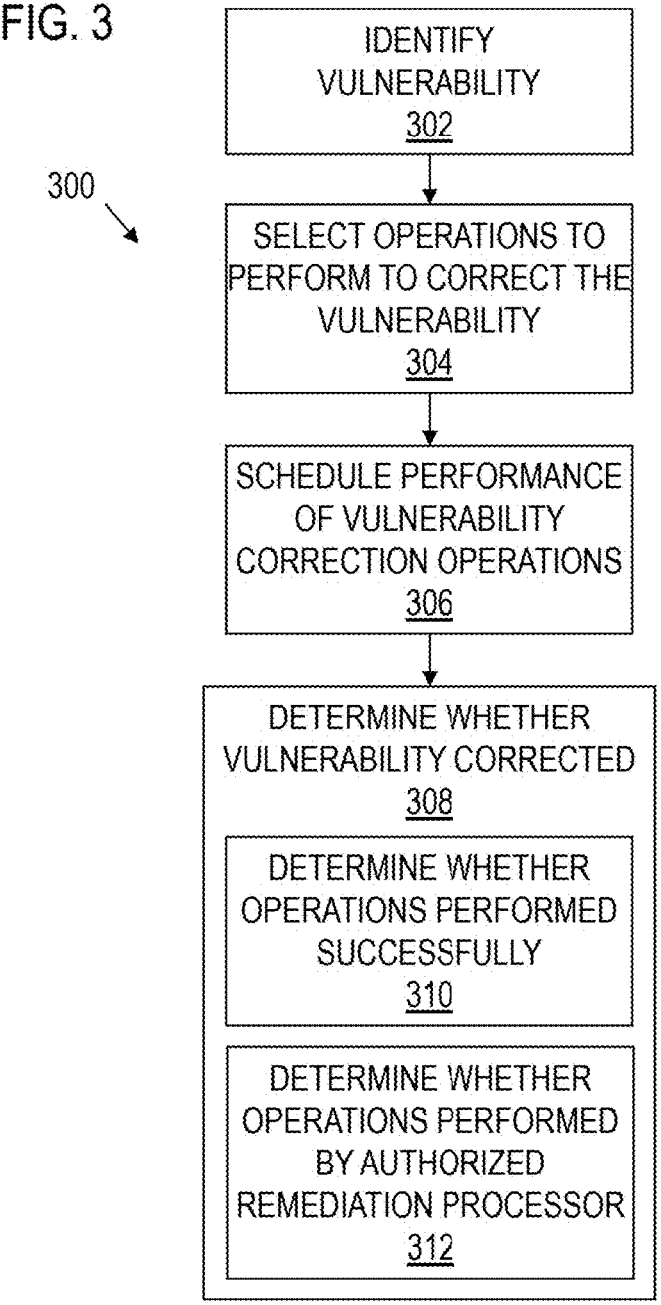
FIGS. 3 and 4 show flow diagrams for a method for verifying vulnerability remediation in accordance with various examples.
Figure 4:
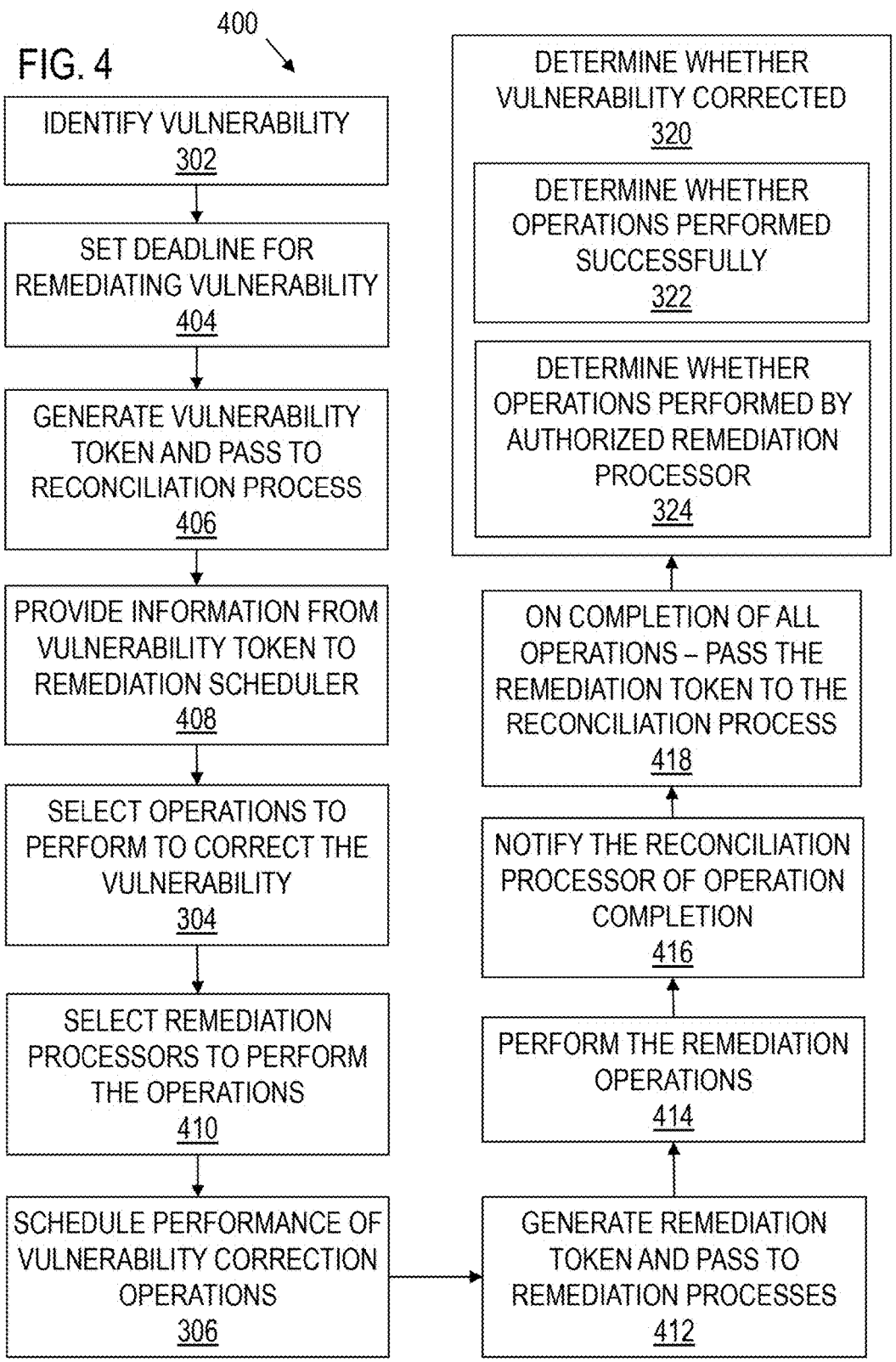

FIGS. 3 and 4 show flow diagrams for a method for verifying vulnerability remediation in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the methods 300 and 400 can be implemented as instructions stored in a storage device and executed by one or more processors.

In block 302, the vulnerability scanners 216 examine the computer(s) 112 for vulnerabilities. The vulnerability scanners 216 identify vulnerability 114 in a computer 112. The vulnerability scanners 216 notify the vulnerability monitor 104 that the vulnerability 114 has been identified in the computer 112.

In block 404, the vulnerability monitor 104 sets a completion deadline time for correction of the vulnerability 114 and gathers other important information about the identified vulnerability (e.g. computer found on, etc.).

In block 406, the vulnerability monitor 104 generates a vulnerability token. The vulnerability token is a message structure that identifies the computer 112, the vulnerability 114, and other parameters. The vulnerability monitor 104 signs the vulnerability token, and passes the signed vulnerability token to the reconciliation engine 106.

In block 408, the reconciliation engine 106 provides the information contained in the vulnerability token to the remediation scheduler 108. The remediation scheduler 108 examines the information, determines the operations to be performed to correct the vulnerability 114 in block 304, and selects remediation processors 110 to perform the vulnerability correction operations in block 410.

In block 306, the remediation scheduler 108 schedules performance of the remediation operations by the selected remediation processors 110.

In block 412, the remediation scheduler 108 generates a remediation token that specifies the remediation operations to be performed and the remediation processors 110 selected to perform the remediation operations. The remediation token include fields to be written by the remediation processors 110 on completion of each remediation operation.

In block 414, the remediation scheduler 108 passes the remediation token to the selected remediation processors 110, and the remediation processors 110 perform the operations specified in the remediation token. Each remediation processor 110 performing one of the remediation operations writes results of testing the operation performed to the remediation token and signs the remediation token.

In block 416, each remediation processor 110 performing one of the operations notifies the reconciliation engine 106 of completion of the operation performed. The notification may be provided by passing a copy of the remediation token to the reconciliation engine 106 on completion of each operation.

In block 418, all of the remediation operations specified in the remediation token have been completed. The remediation processor 110 performing the last of the operations returns the remediation token to the remediation scheduler 108. The remediation scheduler 108 signs the remediation token and passes the signed remediation token to the reconciliation engine 106.

In blocks 308 and 320, the reconciliation engine 106 examines the remediation token and determines whether the vulnerability 114 has been corrected. Determining whether the vulnerability has been corrected includes determining whether the operations specified in the remediation frames of the remediation token, have been performed successfully in blocks 310 and 322, and determining whether the operations were performed by authorized remediation processors 110 in blocks 312 and 324. The vulnerability may also be deemed corrected only if the operations are performed prior to the deadline set by the vulnerability monitor 104, and the remediation token is signed by the remediation scheduler 108. Thus, implementations of the vulnerability remediation verification sub-system 102 implementing these methods positively validate correction of an identified vulnerability.

Figure 5:
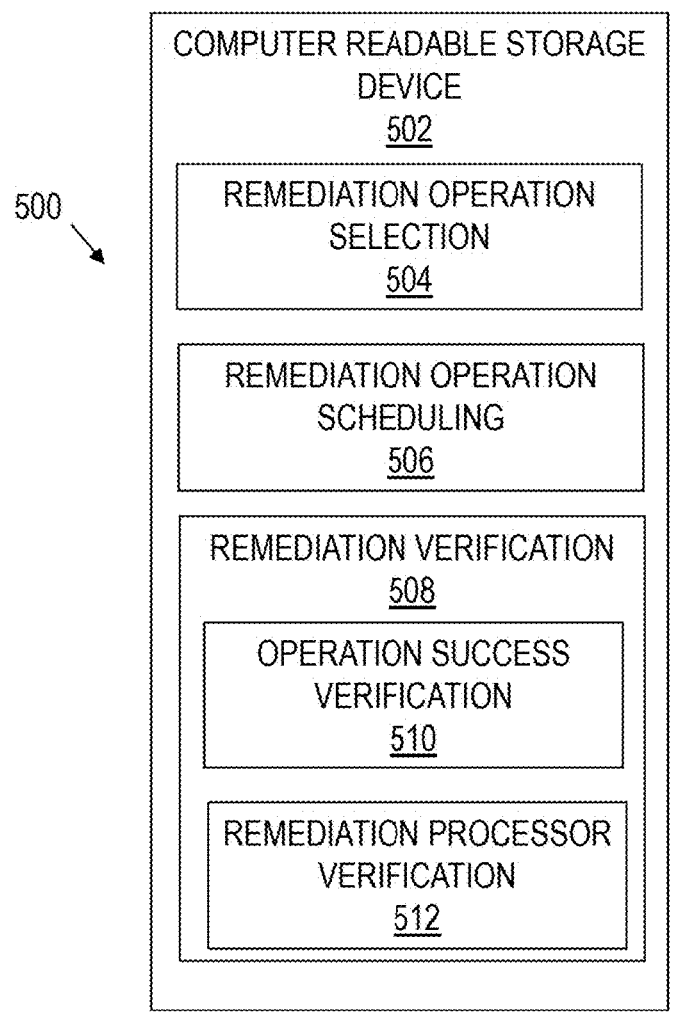
FIG. 5 shows a block diagram of a computer-readable storage device containing instructions for verifying vulnerability remediation in accordance with various examples.

FIG. 5 shows a block diagram 500 of a computer-readable storage device 502 that contains instructions for verifying vulnerability remediation in accordance with various examples. The computer readable storage device 502 is a non-transitory storage medium that includes volatile storage such as random access memory, non-volatile storage (e.g., a hard drive, an optical storage device (e.g., CD or DVD), FLASH storage, read-only-memory), or combinations thereof.

The storage device 502 includes remediation operation selection 504, remediation operation scheduling 506, and remediation verification 508. The remediation operation selection 504 includes instructions that are executable by a processor in the remediation scheduler 108 to select remediation operations to be performed to correct a vulnerability.

The remediation operation scheduling 506 includes instructions that are executable by a processor in the vulnerability scheduler 108 to schedule remediation processors 110 to perform the operations selected to correct a vulnerability.

The remediation verification 508 includes instructions that are executable by a processor in the reconciliation engine 106 to determine whether a vulnerability has been corrected. The remediation verification 508 includes operation success verification 510 and remediation processor verification 512. The operation success verification 510 includes instructions that are executable by a processor in the reconciliation engine 106 to determine whether the operations selected to correct a vulnerability have been successfully performed. The remediation processor verification 512 includes instructions that are executable by a processor in the reconciliation engine 106 to determine whether the operations selected to correct a vulnerability have been performed by an authorized remediation processor 110.

Figure 6:
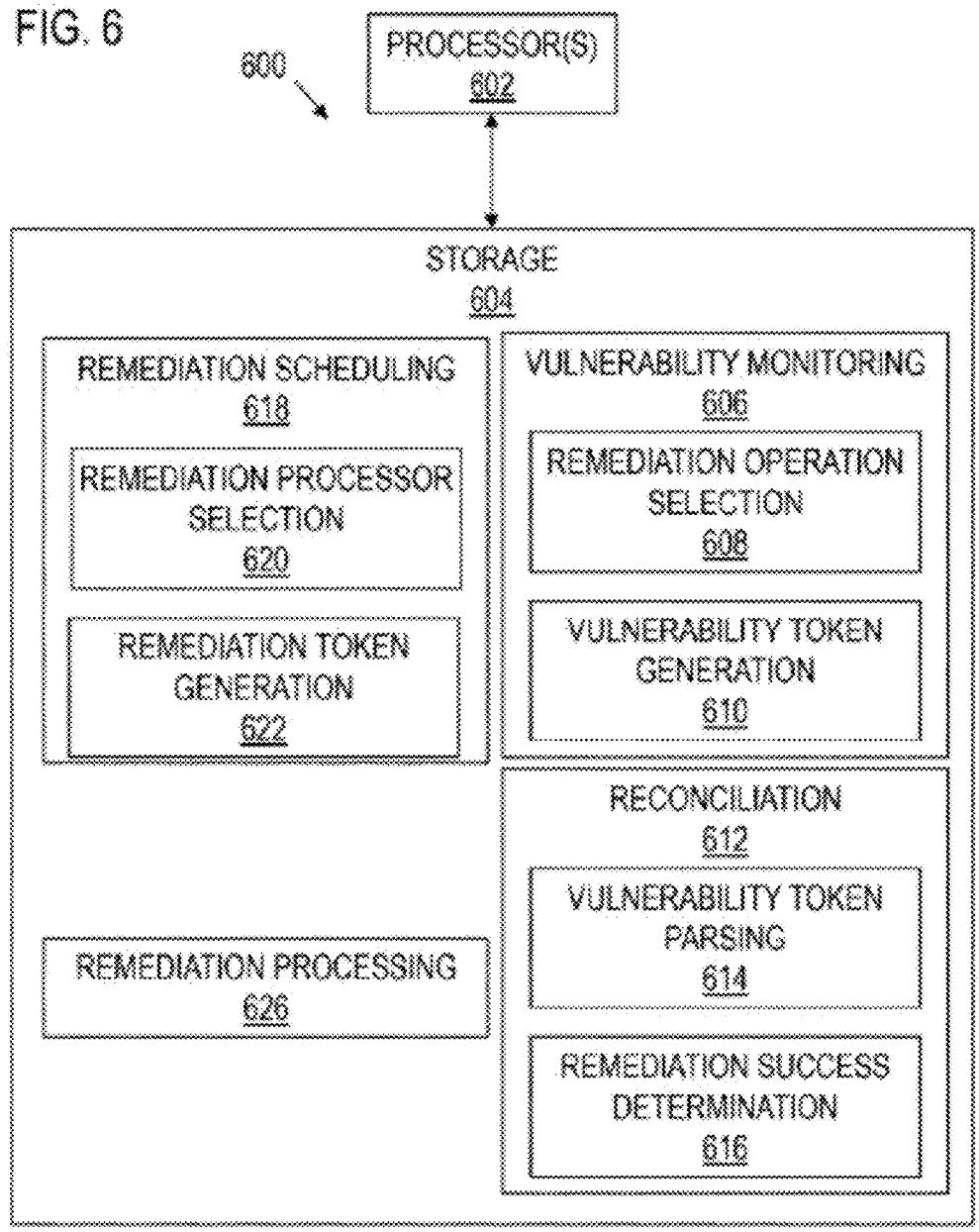
FIG. 6 shows a block diagram of a computer configured to perform verification of vulnerability remediation in accordance with various examples.

FIG. 6 shows a block diagram of a computer 600 configured to perform verification of vulnerability remediation in accordance with various examples. The computer 600 may include various components and systems that have been omitted from FIG. 6 in the interest of clarity. For example, the computer 600 may include network adapters, display systems, user interfaces, etc. In some implementations, the computer 600 may include a plurality of communicatively coupled computers.

The computer 602 includes one or more processors 602 and storage 604 coupled to the processors 602. The storage 604 may be the computer-readable storage device 502. The processor 602 is a general-purpose microprocessor, a digital signal processor, a microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and subsystems.

The storage 604 includes vulnerability monitoring logic 606, reconciliation logic 612, remediation scheduling logic 618, and remediation processing logic 626. The remediation processing logic 626 includes instructions executable by the processors 602 to implement the remediation processors 110.

The vulnerability monitoring logic 606 includes instructions executable by the processors 602 to implement the vulnerability monitor 104. Thus, the vulnerability monitor 104 comprises one or more processors 602 and instructions of the vulnerability monitoring logic 606. The vulnerability monitoring logic 606 includes remediation operation selection logic 608 and vulnerability token generation logic 610 that include instructions executable by the processors 602 to perform remediation operation selection and vulnerability token generation as described herein.

The reconciliation logic 612 includes instructions executable by the processors 602 to implement the reconciliation engine 106. Thus, the reconciliation engine 106 comprises one or more processors 602 and instructions of the reconciliation logic 612. The reconciliation logic 612 includes vulnerability token parsing logic 614 and remediation success determination logic 616 that include instructions executable by the processors 602 to examine the remediation token and determine whether vulnerability remediation is successful as described herein.

The remediation scheduling logic 618 includes instructions executable by the processors 602 to implement the remediation scheduler 108. Thus, the remediation scheduler 108 comprises one or more processors 602 and instructions of the remediation scheduling logic 618. The remediation scheduling logic 618 includes remediation processor selection logic 620 and remediation token generation logic 622 that include instructions executable by the processors 602 to select remediation processors 110 to perform remediation operations, and to generate remediation tokens as described herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
  a vulnerability remediation verification sub-system executed by a processor, the vulnerability remediation verification system to determine whether a vulnerability identified in a computer has been eliminated, and comprising:
    a remediation scheduler to:
      determine, based on the vulnerability identified in the computer, operations to be performed to eliminate the vulnerability; and
      schedule performance of the operations by remediation processors; and;
    a reconciliation engine to determine:
      whether the operations have been successfully performed; and
      whether the operations have been performed by authorized remediation processors;
    a vulnerability monitor to:
      generate a vulnerability token that includes information that:
        specifies the location of the vulnerability;
        specifies the vulnerability; and
        specifies the time by which remediation is to completed;
    wherein the remediation scheduler is further to: generate a remediation token that is separate from the vulnerability token, the remediation token comprising information provided by the reconciliation engine.

2. The system of claim 1, wherein the vulnerability monitor is further to:
  pass the vulnerability token to the reconciliation engine, wherein the reconciliation engine is to:
    extract the information from the vulnerability token; and
    provide the information to the remediation scheduler.

3. The system of claim 2, wherein the remediation scheduler is to:
identify the remediation processors to perform the operations;
generate the remediation token comprising:
the information provided by the reconciliation engine;
a field for recording each action, corresponding to one of the operations, performed by a remediation processor;
a field for recording a result of testing each action by the remediation processor performing the action;
a field for verifying the identity of each remediation processor performing an action corresponding to one of the operations;
a field for verifying identity of the remediation scheduler;
pass the remediation token to one of the identified remediation processors; and
pass the remediation token to the reconciliation engine on completion of the operations.

4. The system of claim 3, wherein the reconciliation engine is to:
establish whether remediation of the vulnerability is successful based on the information contained in the remediation token, and as part of establishing whether the remediation is successful to:
verify that each of the operations to be performed has been completed prior to a deadline time specified by the vulnerability monitor;
verify that each of the operations has been successfully performed based on the result of testing recorded in the remediation token;
verify that each of the operations was performed by authorized remediation processors based on the identity of each remediation processor recorded in the remediation token; and
verify the identity of the remediation scheduler based on the identity of the remediation scheduler recorded in the remediation token.

5. The system of claim 1, wherein the remediation processors are to:
perform the operations; and
provide notifications to the reconciliation engine of completion of each of the operations, and
the reconciliation engine is to track progress towards completion of remediation based on the notifications.

6. A method, comprising:
identifying, by a processor, a vulnerability in a computer;
identifying, based on the vulnerability, operations to be performed to correct the vulnerability;
identifying a time by which remediation of the vulnerability is to be completed;
generating a vulnerability token that includes information that:
specifies a location of the vulnerability;
specifies the vulnerability;
specifies the time by which remediation of the vulnerability is to be completed;
scheduling performance of the operations by remediation processors;
determining whether the vulnerability has been corrected by:
determining whether the operations have been performed successfully; and
determining whether the operations have been performed by authorized remediation processors; and
generating a remediation token that is separate from the vulnerability token, the remediation token comprising:
a field for recording each action performed by an authorized remediation processor.

7. The method of claim 6, further comprising:
passing the vulnerability token to a reconciliation process, and in the reconciliation process:
extracting the information from the vulnerability token; and
providing the information to a remediation scheduler.

8. The method of claim 7, further comprising:
in the remediation processors:
performing the operations; and
providing notifications to the reconciliation process of completion of each of the operations,
tracking, by the reconciliation process, progress towards completion of remediation based on the notifications.

9. The method of claim 7, further comprising:
identifying the remediation processors to perform the operations;
generating the remediation token comprising:
the information provided by the reconciliation process;
a field for recording a result of testing each action by the remediation processor performing the action;
a field for verifying the identity of each remediation processor performing an action corresponding to one of the operations;
a field for verifying identity of the remediation scheduler;
passing the remediation token to one of the identified remediation processors; and
passing the remediation token to the reconciliation process on completion of the operations.

10. The method of claim 9, further comprising:
in the reconciliation process:
establishing whether remediation of the vulnerability is successful based the information on contained in the remediation token, and as part of establishing whether the remediation is successful:
verifying that each of the operations to be performed has been performed prior to the time by which remediation is to be completed;
verifying that each of the operations has been successfully performed based on the result of testing recorded in the remediation token;
verifying that each of the operations was performed by authorized remediation processors based on the identity of each remediation processor recorded in the remediation token;
verifying the identity of the remediation scheduler based on the identity of the remediation scheduler recorded in the remediation token.

11. The method of claim 6, the remediation token further comprising:
a signature of the authorized remediation processor that performed the operations.

12. A non-transitory computer-readable medium encoded with instructions that when executed cause a processor to:
select, based on a vulnerability identified in a computer, operations to be performed to remediate the vulnerability;
schedule performance of the operations by remediation logic; and
determine whether the vulnerability has been remediated by:
determining whether the operations have been performed successfully; and determining whether the operations have been performed by an authorized remediation process; and
track progress towards completion of remediation based on completion of each of the operations,
wherein the remediation logic comprises vulnerability token parsing logic and remediation success determination logic.

13. The computer-readable medium of claim 12, encoded with instructions that when executed cause the processor to:
select a time by which the vulnerability is to be remediated; and
generate a vulnerability token that includes information that:
specifies the location of the vulnerability;
specifies the vulnerability;
specifies the time by which the vulnerability is to be remediated; and
identifies a vulnerability monitoring system that selected the operations and generated the vulnerability token; and
pass the vulnerability token to a reconciliation process, and in the reconciliation process:
extract the information from the vulnerability token; and
provide the information to a remediation scheduling process.

14. The computer-readable medium of claim 13, encoded with instructions that when executed cause the processor to:
select the remediation process to perform the operations;
generate a remediation token comprising:
the operations to be performed to remediate the vulnerability;
the information provided by the reconciliation process;
a field for recording each action, corresponding to one of the operations, performed by the remediation process;
a field for recording a result of testing each action by the remediation process performing the action;
a field for verifying the identity of each remediation process performing an action corresponding to one of the operations;
a field for verifying identity of the remediation scheduling process;
pass the remediation token to the identified remediation process; and
pass the remediation token to the reconciliation process on completion of the operations.

15. The computer-readable medium of claim 14, encoded with instructions that when executed cause the processor to:
in the reconciliation process:
establish whether remediation of the vulnerability is successful based the information on contained in the remediation token, and in establishing whether the remediation is successful:
verify that each of the operations to be performed has been performed prior to the time by which remediation is to be completed;
verify that each of the operations has been successfully performed based on the result of testing recorded in the remediation token;
verify that each of the operations was performed by authorized remediation processes based on the identity of each remediation process recorded in the remediation token;
verify the identity of a remediation scheduler based on the identity of the remediation scheduling process recorded in the remediation token.

16. The computer-readable medium of claim 15, encoded with instructions that when executed cause the processor to:
in the remediation processes:
perform the operations; and
provide notifications to the reconciliation process of completion of each of the operations,
track, by the reconciliation process, progress towards completion of remediation based on the notifications.

* * * * *